(12) United States Patent
Doyle (10) Patent No.: US 11,301,508 B2
(45) Date of Patent: Apr. 12, 2022

(54) SYSTEM FOR CREATING AN AUDIO-VISUAL RECORDING OF AN EVENT

(71) Applicant: Filmily Limited, Totnes (GB)

(72) Inventor: Andy Doyle, Totnes (GB)

(73) Assignee: Filmily Limited, Devon (GB)

( * ) Notice: Subject to any disclaimer, the term of this patent is extended or adjusted under 35 U.S.C. 154(b) by 0 days.

(21) Appl. No.: 16/029,436

(22) Filed: Jul. 6, 2018

(65) Prior Publication Data

US 2019/0026277 A1 Jan. 24, 2019

(30) Foreign Application Priority Data

Jul. 21, 2017 (GB) ..................................... 1711731

(51) Int. Cl.
| | | |
|---|---|---|
| G06F 16/487 | (2019.01) | |
| G11B 27/031 | (2006.01) | |
| H04N 21/8549 | (2011.01) | |
| H04N 21/234 | (2011.01) | |
| H04N 21/2665 | (2011.01) | |

(Continued)

(52) U.S. Cl.
CPC .......... *G06F 16/487* (2019.01); *G06F 16/444* (2019.01); *G06F 16/447* (2019.01); *G06F 16/489* (2019.01); *G06N 20/00* (2019.01); *G11B 27/031* (2013.01); *G11B 27/10* (2013.01); *G11B 27/28* (2013.01); *H04N 5/247* (2013.01); *H04N 5/77* (2013.01); *H04N 7/18* (2013.01); *H04N 9/8205* (2013.01); *H04N 21/21805* (2013.01); *H04N 21/23418* (2013.01);

(Continued)

(58) Field of Classification Search
CPC .......................... G06F 17/30041; G06F 16/487
See application file for complete search history.

(56) References Cited

U.S. PATENT DOCUMENTS

| 10,904,474 B2 * | 1/2021 | Han ...................... H04N 9/8205 |
| 2007/0203927 A1 * | 8/2007 | Cave ...................... G06F 16/14 |

(Continued)

FOREIGN PATENT DOCUMENTS

| EP | 1378910 A2 | 1/2004 |
| GB | 2419768 A | 3/2006 |

(Continued)

OTHER PUBLICATIONS

Intellectual Property Office of the United Kingdom, Patent Act 1977: Combined Search and Examination Report under Sections 17 and 18(3) for GB1711731.8, dated Dec. 22, 2017, UK.

(Continued)

*Primary Examiner* — Andrew C Georgandellis
(74) *Attorney, Agent, or Firm* — Reichel Stohry Dean LLP; Natalie J. Dean; Mark C. Reichel (57) ABSTRACT

Many public events are recorded by members of the public, producing 'user generated content' or 'user generated video'. Such content is often of unreliable and/or inconsistent quality. However, professional recordings of such events are often not possible and/or are inconvenient. In particular, multiple camera angles are often impossible to find using professional equipment and operators. The present invention provides a system and method in which user generated content may be collated, filtered and combined to produce a continuous professional quality audio-visual recording of an event.

14 Claims, 2 Drawing Sheets

(51) Int. Cl.
*H04N 21/218* (2011.01)
*H04N 21/41* (2011.01)
*G06F 16/48* (2019.01)
*G06N 20/00* (2019.01)
*G06F 16/44* (2019.01)
*G11B 27/10* (2006.01)
*G11B 27/28* (2006.01)
*H04N 9/82* (2006.01)
*H04N 7/18* (2006.01)
*H04N 5/77* (2006.01)
*H04N 5/247* (2006.01)

(52) U.S. Cl.
CPC ..... *H04N 21/2665* (2013.01); *H04N 21/4126* (2013.01); *H04N 21/8549* (2013.01)

(56) References Cited

U.S. PATENT DOCUMENTS

| | | | | |
|---|---|---|---|---|
| 2010/0225811 | A1* | 9/2010 | Konvisser | G06F 16/487 348/512 |
| 2012/0066598 | A1 | 3/2012 | Oks et al. | |
| 2012/0106917 | A1 | 5/2012 | Momosaki et al. | |
| 2013/0188923 | A1* | 7/2013 | Hartley | H04N 21/47217 386/241 |
| 2013/0330055 | A1* | 12/2013 | Zimmermann | G06F 16/78 386/240 |
| 2014/0044267 | A1* | 2/2014 | Ojanpera | H04R 3/005 381/56 |
| 2014/0133825 | A1* | 5/2014 | Kozloski | G11B 27/034 386/223 |
| 2015/0319402 | A1* | 11/2015 | Abuelsaad | H04N 5/91 386/224 |
| 2016/0063103 | A1* | 3/2016 | Bostick | G06F 16/40 707/706 |
| 2018/0035136 | A1* | 2/2018 | Crowe | H04N 21/4316 |
| 2019/0013047 | A1* | 1/2019 | Wait | G06K 9/00751 |

FOREIGN PATENT DOCUMENTS

| | | |
|---|---|---|
| GB | 2525035 A | 10/2015 |
| WO | 2010077772 A1 | 7/2010 |
| WO | 2016132678 A1 | 8/2016 |

OTHER PUBLICATIONS

Intellectual Property Office of the United Kingdom, Patent Act 1977: Examination Report under Section 18(3) for GB1711731.8, dated Feb. 28, 2018, UK.

* cited by examiner

SYSTEM FOR CREATING AN AUDIO-VISUAL RECORDING OF AN EVENT

PRIORITY

This application is related to and claims the priority benefit of Great Britain Patent Application Serial No. 1711731.8, filed Jul. 21, 2017. The contents of the foregoing application are hereby incorporated by reference in its entirety into this disclosure.

FIELD

The present invention relates generally to a system and a method of creating an audio-visual recording of an event and finds particular, although not exclusive, utility in creating seamless industry standard videos from user generated content.

BACKGROUND

Many public events are recorded by members of the public, producing 'user generated content' or 'user generated video'. Such content is often of unreliable and/or inconsistent quality.

However, professional recordings of such events are often not possible and/or are inconvenient. In particular, multiple camera angles are often impossible to find using professional equipment and operators. Conventional systems and methods all lack the ability to efficiently collect user generated content and/or professionally generated content of an event, and utilize such content in the aggregate to achieve a seamless industry-standard, quality result.

SUMMARY

According to a first aspect of the present invention, there is provided a system for creating an audio-visual recording of an event, the system comprising: a plurality of devices configured to: record a respective audio-visual clip therewith; record metadata associated with the respective audio-visual clip continually at a maximum interval of 5 seconds, the metadata comprising at least: time data, indicating a time of recording of the respective audio-visual clip; location data, indicating a location of recording of the respective audio-visual clip; and attribute data, indicating an attribute of the respective audio-visual clip; and send the respective audio-visual clip, and the associated metadata, over a wireless network; and a data centre configured to: receive a plurality of the respective audio-visual clips from the plurality of devices over the wireless network; analyse the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extract clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analyse audio-visual data within the clip portions to determine a quality of the audio-visual data, and selecting audio-visual data of a predetermined minimum quality; and combine at least some of the selected audio-visual data together to form a continuous audio-visual recording of the event.

According to a second aspect of the present invention, there is provided a method of creating an audio-visual recording of an event, the method comprising: recording a plurality of audio-visual clips with a plurality of devices; recording metadata associated with each of the plurality of audio-visual clips, the metadata comprising at least: time data, indicating a time of recording of each of the plurality of audio-visual clips; location data, indicating a location of recording of each of the plurality of audio-visual clips; and attribute data, indicating an attribute of each of the plurality of audio-visual clips; wherein, for each of the plurality of audio-visual clips, recording of metadata associated therewith occurs continually at a maximum interval of 5 seconds; sending the plurality of audio-visual clips, and the associated metadata, wirelessly to a data centre; analysing the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extracting clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analysing audio-visual data within the clip portions to determine a quality of the audio-visual data, and selecting audio-visual data of a predetermined minimum quality; and combining at least some of the selected audio-visual data together to form a continuous audio-visual recording of the event.

According to a third aspect of the present invention, there is provided a software application for installation on the plurality of devices in the first aspect, the software application configured to: record an audio-visual clip; record metadata associated with the audio-visual clip continually at a maximum interval of 5 seconds, the metadata comprising at least: time data, indicating a time of recording of the respective audio-visual clip; location data, indicating a location of recording of the respective audio-visual clip; and attribute data, indicating an attribute of the respective audio-visual clip; and send the respective audio-visual clip, and the associated metadata, over a wireless network to a data centre configured to: receive a plurality of the respective audio-visual clips from the plurality of devices over the wireless network; analyse the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extract clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analyse audio-visual data within the clip portions to determine a quality of the audio-visual data, and selecting audio-visual data of a predetermined minimum quality; and combine at least some of the selected audio-visual data together to form a continuous audio-visual recording of the event.

According to a fourth aspect of the present invention, there is provided a data centre configured to: receive a plurality of audio-visual clips from a respective plurality of devices over a wireless network, the plurality of devices configured to: record a respective audio-visual clip therewith; record metadata associated with the respective audio-visual clip continually at a maximum interval of 5 seconds, the metadata comprising at least: time data, indicating a time of recording of the respective audio-visual clip; location data, indicating a location of recording of the respective audio-visual clip; and attribute data, indicating an attribute of the respective audio-visual clip; and send the respective audio-visual clip, and the associated metadata, over a wireless network; analyse the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extract clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analyse audio-visual data within the clip portions to determine a quality of the audio-visual data, and selecting audio-visual data of a predetermined minimum quality; and combine at least some of the selected audio-visual data together to form a continuous audio-visual recording of the event.

BRIEF DESCRIPTION OF THE DRAWINGS

The below-described and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

DETAILED DESCRIPTION

According to a first aspect of the present invention, there is provided a system for creating an audio-visual recording of an event, the system comprising: a plurality of devices configured to: record a respective audio-visual clip therewith; record metadata associated with the respective audio-visual clip continually at a maximum interval of 5 seconds, the metadata comprising at least: time data, indicating a time of recording of the respective audio-visual clip; location data, indicating a location of recording of the respective audio-visual clip; and attribute data, indicating an attribute of the respective audio-visual clip; and send the respective audio-visual clip, and the associated metadata, over a wireless network; and a data centre configured to: receive a plurality of the respective audio-visual clips from the plurality of devices over the wireless network; analyse the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extract clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analyse audio-visual data within the clip portions to determine a quality of the audio-visual data, and selecting audio-visual data of a predetermined minimum quality; and combine at least some of the selected audio-visual data together to form a continuous audio-visual recording of the event.

In this way, user generated content may be collated, filtered and combined to produce a professional quality recording of an event.

The plurality of devices may comprise at least two devices, at least three devices, at least four devices, or more than four devices. The devices may comprise smartphones, tablets, phablets, internet enabled cameras, or any other form of personal computing device. Each device may be configured in the sense that an application/app is installed thereon.

Recording an audio-visual clip may mean storing the clip in a memory of the device; however, such recording may alternatively/additionally mean stream the audio-visual clip to a remote location.

Recording metadata may mean storing the metadata in a memory of the device; however, such recording may alternatively/additionally mean send the audio-visual clip to a remote location for storing.

Recording continually may mean recording continuously; however, in preferred arrangements recording metadata takes place in discrete steps. Time between sequential recording of metadata may be at most 5 seconds, 4 seconds, 3 seconds, 2 seconds, 1 second or 0 seconds.

The location data may comprise at least one of grid reference, latitude and/or longitude, altitude, height, elevation and/or floor of building, bearing and/or direction of view (e.g. via a magnetometer or similar device), and/or angle and/or inclination of view (e.g. via an accelerometer, gyroscope or similar device).

The attribute data may comprise at least one of aspect ratio, orientation (e.g. portrait/landscape), file format, recording volume level, zoom level, focus, exposure, white balance, flash/flash rate, bit rat, frame rate, and/or minimum frame duration.

The metadata may further comprise movement data, which may comprise at least one of velocity, speed, direction and/or course.

The wireless network may comprise a telecommunication network, a GSM network, a cell phone network, a wireless local area network (WLAN), a satellite communication network and/or a terrestrial microwave network.

Sending/receiving data over a wireless network may comprise communicating the data via the network communication protocol.

The data centre may be a centralised and/or distributed location, which may comprise a single or multiple network nodes. The data centre may comprise a computer system for conducting said analysing, extracting and/or combining.

Sending the respective audio-visual clip and the associated metadata may comprise sending the metadata and waiting for a request for the audio-visual clip from the data centre before sending the audio-visual clip. Alternatively, sending the respective audio-visual clip and the associated metadata may comprise sending the audio-visual clip and waiting for a request for the metadata from the data centre before sending the metadata. As a further alternative, sending the respective audio-visual clip and the associated metadata may comprise sending the audio-visual clip and metadata substantially at the same time and/or immediately consecutively.

Analysing the metadata to select audio-visual clips may comprise filtering the audio-visual clips by applying predetermined filters to the metadata. Such pre-determined filters include, but are not limited to the predetermined range of times indicative of a predetermined event, the predetermined range of locations indicative of the predetermined event, and the predetermined range of attributes. The predetermined filters may further comprise other predetermined values of recorded metadata. The predetermined filters may further comprise the predetermined minimum quality of audio-visual data within the clip portions.

The system may further comprise a user interface for collecting the predetermined filters to the metadata from a user. The user interface may be configured to collect predetermined requirements of the continuous audio-visual recording of the event, such as total duration, number of devices to be used in creating the continuous recording, and/or overlaid soundtrack, etc.

Extracting clip portions from the selected audio-visual clips may comprise removing an earlier part of the clip and/or a later part of the clip.

Analysing to determine a quality of the audio-visual data may comprise determining stability, determining blur, image recognition (e.g. identifying a predetermined logo or similar image), facial recognition (e.g. identifying a predetermined person, or persons having a predetermined age range, sex and/or ethnicity), and/or image processing to determine a change in a subject, smiling faces, dancing people, singing people, etc.

The quality may be determined to some predefined level of precision and/or accuracy.

The system, in particular the data centre, may apply predetermined rules for determining which audio-visual clips to select and/or for determining appropriate clip portions to extract from the selected audio-visual clips. In particular, the system may use artificial intelligence/machine learning to determine and/or refine rules for such determinations.

Combining at least some of the selected audio-visual data together may comprise forming a sequence of audio-visual data within the clip portions in which an end time of each preceding one of the audio-visual data within the clip portions is equal to the start time of each following one of the audio-visual data within the clip portions.

In this way, a continuous record of an event may be produced in which multiple camera views may be stitched together to form a continuous real-time sequence.

The system, in particular the data centre, may apply predetermined rules for determining what audio-visual data to select from the clip portions to form the continuous audio-visual recording of the event. In particular, the system may use artificial intelligence/machine learning to determine and/or refine rules for such determinations.

One or more of the plurality of devices may each comprise a respective processor that carries out the steps for which the respective device is configured. Similarly, the data centre may comprise a data centre processor that carries out the steps for which the data centre has been configured.

According to a second aspect of the present invention, there is provided a method of creating an audio-visual recording of an event, the method comprising: recording a plurality of audio-visual clips with a plurality of devices; recording metadata associated with each of the plurality of audio-visual clips, the metadata comprising at least: time data, indicating a time of recording of each of the plurality of audio-visual clips; location data, indicating a location of recording of each of the plurality of audio-visual clips; and attribute data, indicating an attribute of each of the plurality of audio-visual clips; wherein, for each of the plurality of audio-visual clips, recording of metadata associated therewith occurs continually at a maximum interval of 5 seconds; sending the plurality of audio-visual clips, and the associated metadata, wirelessly to a data centre; analysing the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extracting clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analysing audio-visual data within the clip portions to determine a quality of the audio-visual data, and selecting audio-visual data of a predetermined minimum quality; and combining at least some of the selected audio-visual data together to form a continuous audio-visual recording of the event.

The steps of extracting clip portions from the selected audio-visual clips, and analysing audio-visual data within the clip portions to determine a quality of the audio-visual data, may be completed in either order, or in parallel.

According to a third aspect of the present invention, there is provided a software application for installation on the plurality of devices in the first aspect, the software application configured to: record an audio-visual clip; record metadata associated with the audio-visual clip continually at a maximum interval of 5 seconds, the metadata comprising at least: time data, indicating a time of recording of the respective audio-visual clip; location data, indicating a location of recording of the respective audio-visual clip; and attribute data, indicating an attribute of the respective audio-visual clip; and send the respective audio-visual clip, and the associated metadata, over a wireless network to a data centre configured to: receive a plurality of the respective audio-visual clips from the plurality of devices over the wireless network; analyse the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extract clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analyse audio-visual data within the clip portions to determine a quality of the audio-visual data, and selecting audio-visual data of a predetermined minimum quality; and combine at least some of the selected audio-visual data together to form a continuous audio-visual recording of the event.

According to a fourth aspect of the present invention, there is provided a data centre configured to: receive a plurality of audio-visual clips from a respective plurality of devices over a wireless network, the plurality of devices configured to: record a respective audio-visual clip therewith; record metadata associated with the respective audio-visual clip continually at a maximum interval of 5 seconds, the metadata comprising at least: time data, indicating a time of recording of the respective audio-visual clip; location data, indicating a location of recording of the respective audio-visual clip; and attribute data, indicating an attribute of the respective audio-visual clip; and send the respective audio-visual clip, and the associated metadata, over a wireless network; analyse the metadata to select audio-visual clips that: have been recorded at least partially within a predetermined range of times indicative of a predetermined event; have been recorded at least partially within a predetermined range of locations indicative of the predetermined event; and possesses attribute data within a predetermined range of attributes; extract clip portions from the selected audio-visual clips, each of the clip portions: having been recorded within the predetermined range of times indicative of a predetermined event; having been recorded within the predetermined range of locations indicative of the predetermined event; and possessing attribute data within the predetermined range of attributes; analyse audio-visual data within the clip portions to determine a quality of the audio-visual data, and selecting audio-visual data of a predetermined minimum quality; and combine at least some of the selected audio-visual data together to form a continuous audio-visual recording of the event.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

Furthermore, where applicable, the detailed descriptions hereof utilize (at least in part) algorithms, which may be described in terms of symbolic representations of operations on data bits within computer memory representing alphanumeric characters or other information. As described herein, a computing system or device (such as a data centre, smartphone, tablet, phablet, camera, etc.) generally includes a processor for executing instructions and memory for storing instructions and data. When a computing system or device has a series of machine encoded instructions stored in its (or accessible) memory, the computing system or device operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computing system/device itself.

An algorithm is here, and generally, conceived to be a self-consistent sequence of steps leading to a desired result. These steps may require physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be kept in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems and are not accessible except through software systems. Data structures are not the information content of a memory, but rather represent specific electronic structural elements that impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, some manipulations performed may be referred to in terms commonly associated with mental operations performed by a human operator (such as "determining" or "analyzing"). No such capability of a human operator is necessary, or desirable in most cases, in any of the operations described herein which form part of the embodiments of the present application; the operations are machine operations. Indeed, a human operator could not perform many of the machine operations described herein due to the networking, concurrent audio-visual recording, and vast quantity of data that may be at play in the present disclosure. This is especially true with respect to the operations that provide data aggregation, analysis, collation, and filtering techniques.

As previously noted, useful machines for performing the operations of one or more embodiments hereof include general purpose digital computers, microprocessors, smartphones, tablets, phablets, internet enabled cameras, or any other form of personal computing device handheld or otherwise mobile devices. In all cases the distinction between the method operations in operating a computing device and the method of computation itself should be recognized. One or more embodiments of the present disclosure relate to methods and apparatus for operating a computing device in processing electrical or other (e.g., mechanical or chemical) physical signals to generate other desired physical manifestations or signals.

The computing devices, data centres, and systems described herein may operate on one or more software modules and/or applications, which are collections of signals stored on a media that represent a series of machine instructions that enable the processor to perform the machine instructions that implement the algorithmic steps. Such machine instructions may be the actual computer code the processor interprets to implement the instructions, or alternatively may be a higher level of coding of the instructions that is interpreted to obtain the actual computer code. The software module or application may also include a hardware component, wherein some aspects of the algorithm are performed by the circuitry itself rather as a result of an instruction.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

Figure 1:
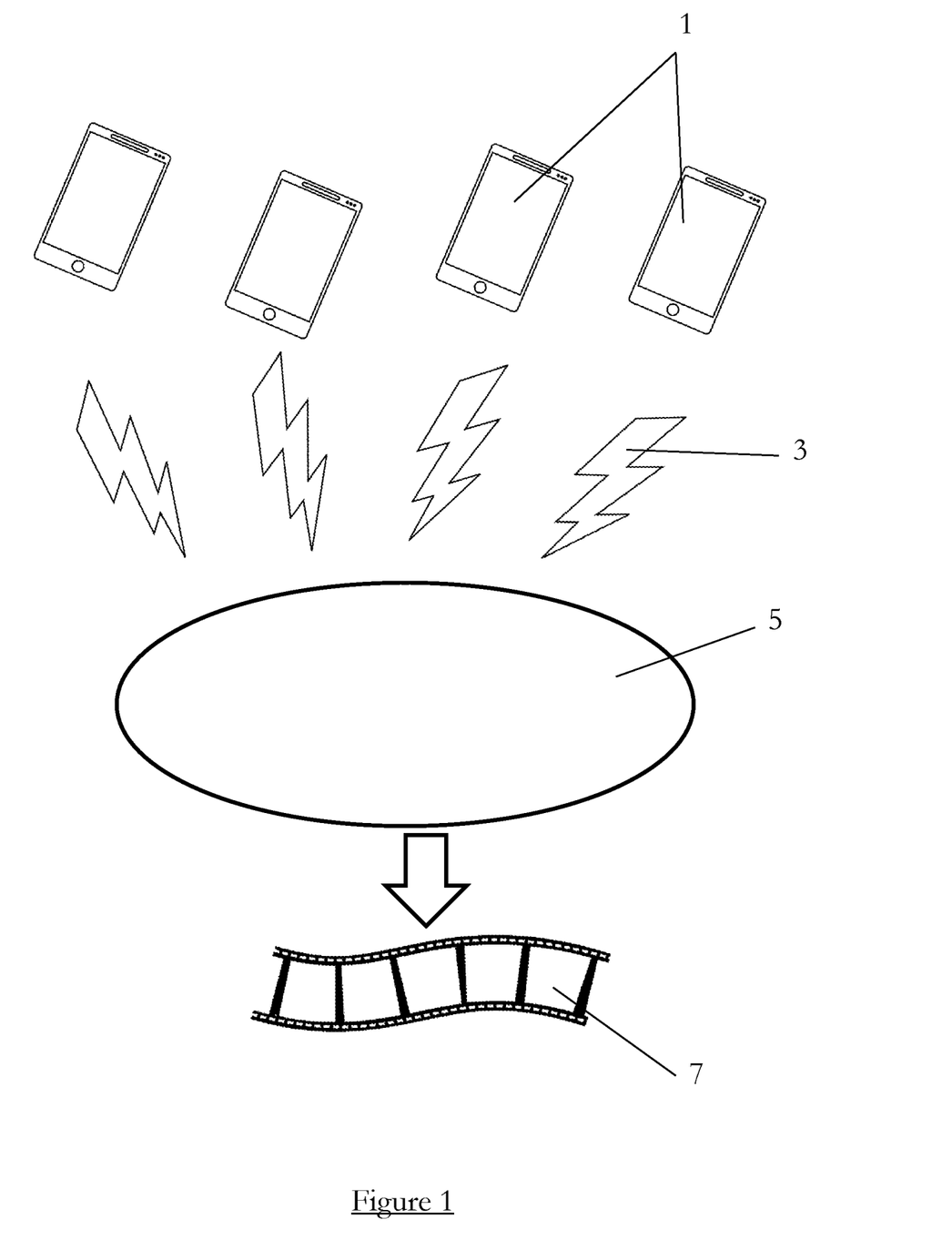
FIG. 1 shows a system for creating an audio-visual recording of an event.

FIG. 1 shows a system for creating an audio-visual recording of an event, in which four smartphones 1 may be used to record video clips and wirelessly transfer 3 the video clips to a data centre 5, where the video clips undergo processing to form a seamless audio-visual recording of the event 7.

Figure 2:
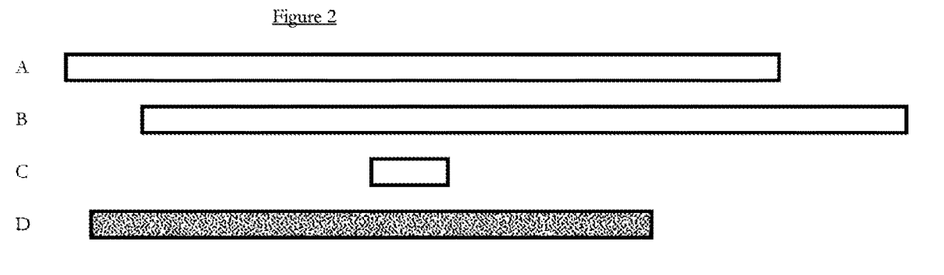
FIG. 2 shows four audio-visual clips arranged by time.

FIG. 2 shows four audio-visual clips A-D arranged by time along the horizontal, such that A starts recording first, then D, then B, then C which stops first, then D, then A, then finally B. Processing of these video clips is carried out in which it is determined from the accompanying metadata that clip D was taken at a location other than the location of the event and is discarded (dotted region).

Figure 3:
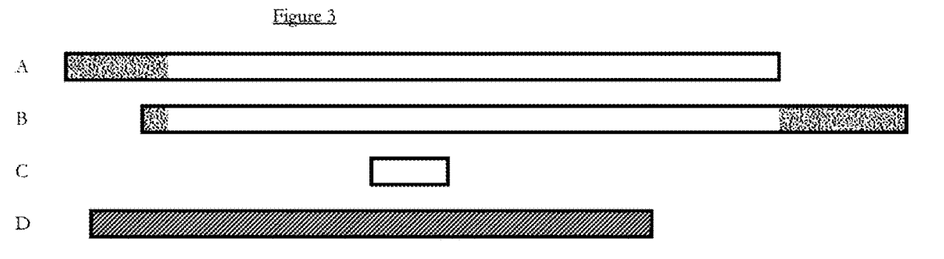
FIG. 3 shows the four audio-visual clips of FIG. 2 after selection of clips.

FIG. 3 shows the four audio-visual clips of FIG. 2 with video D removed from consideration (striped region). Clip portions of the videos A, B and C are extracted (white) and the remaining portions are discarded (dotted regions), based on time data; that is the discarded portions (dotted regions) occur before or after the desired event.

Figure 4:
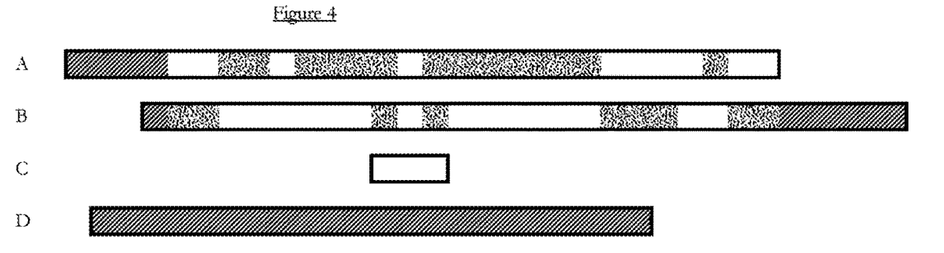
FIG. 4 shows the four audio-visual clips of FIG. 3 after extraction of clip portions.

FIG. 4 shows the four audio-visual clips of FIG. 3 after extraction of clip portions, again with parts of the videos removed from consideration shown striped. The remaining extracted clip portions (white in FIG. 3) are analysed for quality purposes. Video data in the extracted clip portions that does not meet some quality standard (e.g. blur, camera shake, direction information, etc.) is discarded (dotted regions).

Figure 5:
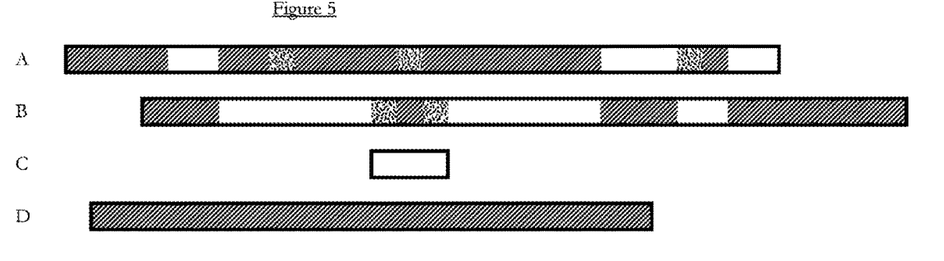
FIG. 5 shows the four audio-visual clips of FIG. 4 after analysing quality of audio-visual data within the clip portions, and selection.

FIG. 5 shows the four audio-visual clips of FIG. 4 after analysing quality of audio-visual data within the clip portions, with substandard data discarded. The data centre must now decide how to combine the suitable video data by applying a further set of combination rules, such as avoiding switching camera angles too quickly, or staying on one particular view for too short a period (dotted regions).

Figure 6:
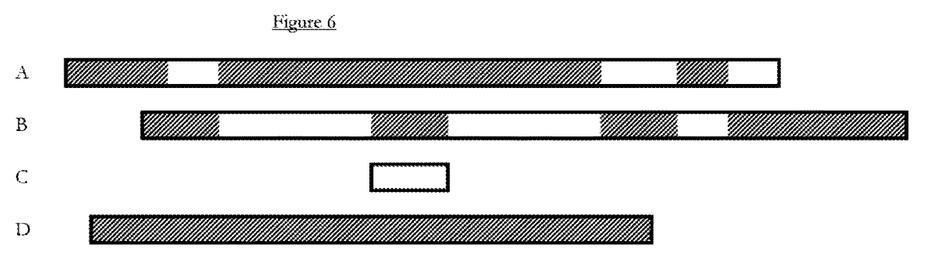
FIG. 6 shows the four audio-visual clips of FIG. 5 after selection of audio-visual data for combining.

FIG. 6 shows the four audio-visual clips of FIG. 5 after selection of audio-visual data for combining into a single video.

The invention claimed is:

1. A system for creating an audio-visual recording of an event, the system comprising:
a plurality of devices configured to:
record a respective audio-visual clip therewith;
record metadata associated with the respective audio-visual clip continually at a maximum interval of 5 seconds, the metadata comprising at least:
time data, indicating a time of recording of the respective audio-visual clip;
location data, indicating a location of recording of the respective audio-visual clip; and
attribute data, indicating an attribute of the respective audio-visual clip; and
send the respective audio-visual clip, and the associated metadata, over a wireless network; and
a data centre configured to:
receive a plurality of the respective audio-visual clips from the plurality of devices over the wireless network;
analyse the metadata to select audio-visual clips that:
have been recorded at least partially within a predetermined range of times indicative of a predetermined event;
have been recorded at least partially within a predetermined range of locations indicative of the predetermined event; and
possesses attribute data within a predetermined range of attributes;
analyse the metadata to select clip portions from the selected audio-visual clips, each of the clip portions:
having been recorded within the predetermined range of times indicative of a predetermined event;
having been recorded within the predetermined range of locations indicative of the predetermined event; and
possessing attribute data within the predetermined range of attributes;
extract the selected clip portions from the selected audio-visual clips;
analyse audio-visual data within the extracted clip portions to determine a quality of the audio-visual data, and selecting parts of the extracted clip portions having audio-visual data of a predetermined minimum quality; and
combine at least some of the selected parts of the extracted clip portions together to form a cohesive and continuous audio-visual recording of the event by applying a set of combination rules to select audio-visual data such that each view and camera angle of the recording is maintained for more than a threshold period;
wherein each of the plurality of devices is configured to first send the respective audio-visual clip and then wait for a request for the metadata from the data centre before sending the metadata.

2. The system of claim 1, wherein the plurality of devices are configured to send the audio-visual clip and metadata substantially at the same time and/or immediately consecutively.

3. The system of claim 1, wherein the data centre is configured to filter the audio-visual clips by applying predetermined filters to the metadata, the predetermined filters comprising the predetermined range of times indicative of a predetermined event, the predetermined range of locations indicative of the predetermined event, and the predetermined range of attributes.

4. The system of claim 3, wherein the predetermined filters further comprise the predetermined minimum quality of audio-visual data within the clip portions.

5. The system of claim 3, further comprising a user interface for collecting the predetermined filters to the metadata from a user.

6. The system of claim 5, wherein the user interface is configured to collect predetermined requirements of the continuous audio-visual recording of the event.

7. The system of claim 1, wherein the data centre is configured to determine stability and/or blur.

8. The system of claim 1, wherein the data centre is configured to forming a sequence of audio-visual data within the clip portions in which an end time of each preceding one of the audio-visual data within the clip portions is equal to the start time of each following one of the audio-visual data within the clip portions.

9. The system of claim 1, wherein the data centre is configured to apply predetermined rules for determining which audio-visual clips to select, for determining appropriate clip portions to extract from the selected audio-visual clips, and/or for determining what audio-visual data to select from the clip portions to form the continuous audio-visual recording of the event.

10. The system of claim 9, wherein the data centre is configured to use artificial intelligence/machine learning to determine and/or refine rules for such determination(s).

11. A method of creating an audio-visual recording of an event, the method comprising:
a plurality of devices each recording a respective audio-visual clip;
the plurality of devices each recording metadata associated with the respective audio-visual clip, the metadata comprising at least:
time data, indicating a time of recording of each of the plurality of audio-visual clips;
location data, indicating a location of recording of each of the plurality of audio-visual clips; and
attribute data, indicating an attribute of each of the plurality of audio-visual clips;
wherein, for each of the plurality of audio-visual clips, recording of metadata associated therewith occurs continually at a maximum interval of 5 seconds;

the plurality of devices each sending the respective audio-visual clip, and the associated metadata, over a wireless network;

a data centre receiving a plurality of the respective audio-visual clips from the plurality of devices over the wireless network;

the data center analysing the metadata to select audio-visual clips that:
- have been recorded at least partially within a predetermined range of times indicative of a predetermined event;
- have been recorded at least partially within a predetermined range of locations indicative of the predetermined event; and
- possesses attribute data within a predetermined range of attributes;

the data centre analysing the metadata to select clip portions from the selected audio-visual clips, each of the clip portions:
- having been recorded within the predetermined range of times indicative of a predetermined event;
- having been recorded within the predetermined range of locations indicative of the predetermined event; and
- possessing attribute data within the predetermined range of attributes;

the data centre extracting the selected clip portions from the selected audio-visual clips;

the data centre analysing audio-visual data within the extracted clip portions to determine a quality of the audio-visual data, and selecting parts of the extracted clip portions having audio-visual data of a predetermined minimum quality; and the data centre combining at least some of the selected parts of the clip portions together to form a cohesive and continuous audio-visual recording of the event by applying a set of combination rules to select audio-visual data such that each view and camera angle of the recording is maintained for more than a threshold period;

wherein each of the plurality of devices is configured to first send the respective audio-visual clip and then wait for a request for the metadata from the data centre before sending the metadata.

12. The method of claim 11, wherein the step of extracting clip portions from the selected audio-visual clips is completed before the step of analysing audio-visual data within the clip portions to determine a quality of the audio-visual data.

13. The method of claim 11, wherein the step of analysing audio-visual data within the clip portions to determine a quality of the audio-visual data is completed before the step of extracting clip portions from the selected audio-visual clips.

14. The method of claim 11, wherein the steps of extracting clip portions from the selected audio-visual clips, and analysing audio-visual data within the clip portions to determine a quality of the audio-visual data, are completed at substantially the same time.

* * * * *